United States Patent Office 3,217,031
Patented Nov. 9, 1965

3,217,031
PREPARATION OF PURE 11,12-BIS-(ACETOXY METHYL)CARBORANE
Marvin M. Fein, Westfield, and John E. Paustian, Whippany, N.J., assignors to Thiokol Chemical Corporation, Bristol, Pa., a corporation of Delaware
No Drawing. Filed Oct. 30, 1961, Ser. No. 149,484
5 Claims. (Cl. 260—491)

This invention relates to the production of organo-boron compounds and more particularly, to the production in relatively pure form of 11,12 bis-(acetoxymethyl) carborane.

In recent years considerable work has been done on the preparation of organo-boron compounds and their use in the production of high energy fuels for both aircraft and rocket propulsion. In connection with one phase of this work it has been proposed that organo-boron compounds, usually organo-boranes, be incorporated in solid rocket propellants of the type that comprises a combustible organic material and inorganic oxidizer. The organo-borane may be incorporated in the solid propellant in a variety of ways, depending upon its physical and chemical properties. Thus if the organo-borane is a liquid, it may be mixed as such with the inorganic oxidizer or if the organo-boron is a solid, it may be mixed in powder form with the oxidizer and compacted either with or without a binder to form propellant grains.

In making one widely used type of rocket propellant, the inorganic oxidizer is dispersed in a liquid polymer to form a mixture that is cast in a rocket casing and cured to form a case-bonded elastomeric propellant grain therein. Among the numerous liquid polymers that have been suggested for this purpose are the isocyanate-terminated polyesters made by condensing polycarboxylic acids with polyhydric alcohols to form polyesters which are then reacted with diisocyanates to form liquid polyurethane prepolymers. Such prepolymers when compounded with the oxidizer and other propellant ingredients are readily curable to form elastomeric fuel binders having desirable properties.

It has been previously suggested that solid propellants having an improved specific impulse can be made by using boron-containing polyols or polyacids in preparing the polyurethane prepolymers to be used in formulating the solid propellants. For example, a boron-containing diol can be condensed with a dicarboxylic acid such as adipic acid to form a polyester which is then reacted with a diisocyanate such as tolylene diisocyanate to form a polyurethane prepolymer. In this way substantial amounts of boron can be incorporated in the backbone structure of a polymer useful as a fuel binder in solid propellants.

The product produced by the method here claimed is useful as an intermediate in preparing a wide variety of liquid and solid organo-boranes for the various end uses outlined above. For example, the 11,12 bis-(acetoxymethyl)carborane produced by the present method may be converted by transesterification into bis-(hydroxymethyl)carborane, a high-boron diol having reactive hydroxy groups through which it can be reacted in accordance with known reaction techniques to produce a large variety of liquid and solid organoboranes that may be incorporated in conventional hydrocarbon fuels and rocket propellants to increase the energy output thereof. In particular, the high-boron diol may be condensed with dicarboxylic acids, such as oxalic or adipic acids, to form polyesters for use in making polyurethane fuel binders in the manner outlined above.

Transesterification of the bis-(acetoxymethyl)carborane can be conveniently effected by heating it in methanol solution in the presence of anhydrous hydrogen chloride. The methyl acetate formed in the reaction is removed by distillation of a methyl acetate-methanol azeotrope. The bis(hydroxymethyl)carborane formed is recovered in relatively pure form by recrystallization from toluene. In order to secure an acceptable product by this transesterification reaction, it is necessary that relatively pure bis-(acetoxymethyl)carborane be used as a starting material. It is an important advantage of the present process that it produces bis-(acetoxymethyl)carborane having a purity substantialy higher than that yielded by prior processes.

It is an object of the present invention to provide a novel and improved process of making bis-(acetoxymethyl)carborane. It is another object of the invention to provide a method for making bis-(acetoxymethyl)carborane in good yield and of high purity. Other objects of the invention will be in part obvious and in part pointed out hereafter.

In accordance with the present invention bis-(acetoxymethyl)carborane is prepared by reaction of bis-(acetonitrilo(decaborane with 1,4-diacetoxy-2-butyne. The bis(nitrilo)decaborane can be prepared by reaction of methyl cyanide with decaborane by the method described in the co-pending application of Murray S. Cohen et al. Serial No. 690,407, filed October 15, 1957. As disclosed in that application, bis-(acetonitrilo)decaborane can be made by reaction from 0.01 to 14 mols of acetonitrile with decaborane at a temperature of 0° to 180° C. The 1,4-diacetoxy-2-butyne used as a starting material in the present process can be conveniently prepared by esterifying 2-butyne-diol-1,4 with acetic acid using conventional esterification techniques.

In carrying out the present process, the bis-(acetonitrilo)decaborane and 1,4-diacetoxy-2-butyne are heated in organic solvent solution at a temperature of 60° to 100° C. for a period of one to ten hours. The reaction that occurs predominantly under these conditions may be represented by the following equation:

$$(CH_3CN)_2B_{10}H_{12} + CH_3\underset{\underset{O}{\|}}{C}OCH_2C{\equiv}CCH_2O\underset{\underset{O}{\|}}{C}CH_3 \longrightarrow$$

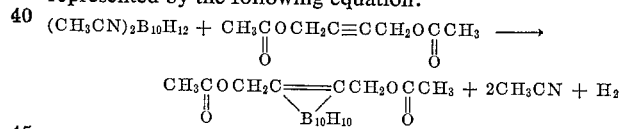

However, the reaction mixture obtained contains, in addition to the desired bis-(acetoxymethyl)carborane, certain other boranes having non-carborane B—H bonds which are difficult to separate from the desired product. It has been found that the compounds having non-carborane B—H bonds can be selectively destroyed by heating the reaction mixture with a lower alkanol such as methyl, ethyl, or propyl alcohol. By heating the reaction mixture at a temperature of say 60° C. or higher for several hours, the non-carborane boranes are converted to corresponding alkyl borates which along with the excess alkanol can be readily removed from the reaction mixture by distillation. The bis-(acetoxymethyl)carborane can then be recovered from the residue of this distillation in any of various ways.

One procedure that has been found satisfactory for recovering the bis-(acetoxymethyl)carborane from the distillation residue comprises extraction of the carborane with a hydrocarbon solvent. Aliphatic hydrocarbons, including alkanes of say 4 to 12 carbon atoms, e.g., hexane and petroleum distillate fractions, can be used for this purpose. The hydrocarbon solution of the bis-(acetoxymethyl)carborane is cooled to precipitate the crude product which may then be recrystallized one or more times to obtain a product having the desired purity.

In order to point out more fully the nature of the present invention, the following specific embodiment is given of a preferred embodiment of the present method: A mixture of 1000 grams of bis-(acetonitrilo)decaborane and 758 grams of 1,4-diacetoxy-2-butyne dissolved in 7760 grams of toluene was prepared and heated at a temperature of 60° to 98° C. for 7.6 hours. The reaction product was then cooled to room temperature and filtered. The filtrate was mixed with 2000 cc. of methanol and heated at a temperature of 52° to 68° C. for 4.8 hours to convert non-carborane constituents of the mixture to methyl borate, after which the methyl borate and excess methanol were removed by distillation.

The distillation residue was mixed with 7100 ml. of boiling hexane to extract the bis-(acetoxymethyl)carborane therefrom. The hexane solution was then decanted and cooled to −20° C. at which temperature the acetoxymethylcarborane precipitated and was filtered and dried. The product thus obtained comprised 856 grams and upon analysis was shown to be 96% pure. This product was then additionally purified by recrystallization from methanol to yield 776 grams of pure product. This corresponded to a yield of 54.1% of the theoretical yield.

The product thus obtained was converted to bis-(hydroxymethyl)carborane in the following manner: A solution of 674 grams of the bis-(acetoxymethyl)carborane in 1150 ml. of methanol was heated for four hours in the presence of anhydrous hydrogen chloride. The reaction product was heated to remove, as a methyl acetate-methanol azeotrope, the methyl acetate formed during the reaction and excess methanol. The residue was recrystallized from toluene. The resulting product weighed 470 grams and had an average hydroxyl number of 16.64 as compared with a theoretical hydroxyl number of 16.48 for the pure material. A yield of 97.8% was obtained on the basis of the bis-(acetoxymethyl)carborane used as a starting material.

From the foregoing description it will be apparent that the present invention provides a method of making bis-(acetoxymethyl)carborane in high purity, which compound can be efficiently converted to bis-(hydroxymethyl)carborane, which is a high-boron diol monomer capable of being reacted with a variety of acidic materials to form organo-boron compounds that can be used as fuel additives and components of propellants. It is of course to be understood that the foregoing example is intended to illustrate only and that numerous changes can be made in the proportions and conditions specifically disclosed without departing from the spirit of the invention as defined in the appended claims.

We claim:
1. The method of making high purity 11,12-bis-(acetoxymethyl)carborane which comprises heating a mixture of bis-(acetonitrilo)decaborane and 1,4-diacetoxy-2-butyne to form a reaction product containing 11,12 - bis - (acetoxymethyl)carborane, adding a lower alkanol to said reaction product and heating to convert to lower alkyl borate any boranes other than said carborane present in said mixture, distilling said alkyl borate and excess alkanol from the mixture to leave a residue containing said carborane, and recovering said carborane from said residue.

2. A method according to claim 1 and wherein said lower alkanol is methanol.

3. A method according to claim 1 and wherein the carborane is separated from the distillation residue by extraction with an aliphatic hydrocarbon solvent of 4 to 12 carbon atoms.

4. A method according to claim 3 and wherein said solvent is n-hexane.

5. A method according to claim 1 and wherein said carborane is recovered from said solvent by cooling and crystallization.

No references cited.

LORRAINE A. WEINBERGER, *Primary Examiner.*

LEON D. ROSDOL, CARL D. QUARFORTH,
*Examiners.*